US012568405B2

(12) United States Patent
Lin et al.

(10) Patent No.: US 12,568,405 B2
(45) Date of Patent: Mar. 3, 2026

(54) POWER SAVING FEATURE ASSISTANCE INFORMATION IN 5GS AND EPS

(71) Applicant: MEDIATEK INC., Hsin-Chu (TW)

(72) Inventors: Yuan-Chieh Lin, Hsin-Chu (TW); Chi-Hsien Chen, Hsin-Chu (TW)

(73) Assignee: MediaTek Inc., Hsin-chu (TW)

( * ) Notice: Subject to any disclaimer, the term of this patent is extended or adjusted under 35 U.S.C. 154(b) by 531 days.

(21) Appl. No.: 17/963,178

(22) Filed: Oct. 10, 2022

(65) Prior Publication Data

US 2023/0135662 A1      May 4, 2023

Related U.S. Application Data

(60) Provisional application No. 63/274,575, filed on Nov. 2, 2021.

(51) Int. Cl.
| | |
|---|---|
| *H04W 36/00* | (2009.01) |
| *H04W 52/02* | (2009.01) |
| *H04W 68/00* | (2009.01) |

(52) U.S. Cl.
CPC ... *H04W 36/0022* (2013.01); *H04W 52/0229* (2013.01); *H04W 68/005* (2013.01)

(58) Field of Classification Search
CPC ......... H04W 36/0022; H04W 52/0229; H04W 68/005; H04W 52/0258; H04W 52/0216; H04W 36/0033; H04W 36/0055; H04W 36/14; H04W 52/0248; H04W 60/00; Y02D 30/70
See application file for complete search history.

(56) References Cited

U.S. PATENT DOCUMENTS

| | | | | |
|---|---|---|---|---|
| 10,880,802 | B1 * | 12/2020 | Bakker | ................. H04W 60/00 |
| 2018/0376384 | A1 * | 12/2018 | Youn | ................... H04W 36/144 |
| 2019/0053308 | A1 * | 2/2019 | Castellanos Zamora | .................... |
| | | | | H04L 65/1073 |
| 2019/0261260 | A1 * | 8/2019 | Dao | ...................... H04W 48/00 |
| 2019/0297121 | A1 * | 9/2019 | Qiao | ................... H04L 65/1016 |

(Continued)

OTHER PUBLICATIONS

Europe IPO, search report for the European patent application 22204598.1, dated Mar. 10, 2023 (15 pages).

(Continued)

*Primary Examiner* — Yuwen Pan
*Assistant Examiner* — Samuel H. Leonard
(74) *Attorney, Agent, or Firm* — Helen Mao; Zheng Jin; Imperium Patent Works

(57) ABSTRACT

A method of applying power-saving feature assistance information for emergency PDU session or PDN connection for emergency bearer service associated with 3GPP access is provided. In 5GS, when an emergency PDU session (associated with 3GPP access) is successfully established after the UE received the Negotiated PEIPS assistance information IE during the last registration procedure, the UE does not use the PEIPS assistance information until the emergency PDU session is successfully moved out of 5GS 3GPP access. In EPS, when an PDN connection for emergency bearer service is successfully established after the UE received the Negotiated WUS assistance information IE during the last registration (Attach/TAU) procedure, the UE does not use the WUS assistance information until the PDN connection for emergency bearer service is successfully moved out of EPS.

19 Claims, 4 Drawing Sheets register to a 5G system (5GS) over 3GPP access in a wireless communication network, wherein the UE receives power-saving feature assistance information during the registration procedure, wherein the power-saving feature is a Paging Early Indication with Paging Subgrouping (PEIPS) — 701 establish an emergency protocol data unit (PDU) session over the 3GPP access — 702 stop applying the power-saving feature assistance information upon the emergency PDU session is established — 703 start applying the power-saving feature assistance information upon the emergency PDU session is successfully moved out of the 5GS 3GPP access — 704

(56)     References Cited

U.S. PATENT DOCUMENTS

| 2022/0124674 A1* | 4/2022 | Babaei | .................. | H04W 68/02 |
|---|---|---|---|---|
| 2023/0136425 A1* | 5/2023 | Kim | .................. | H04W 36/0066 |
| | | | | 370/331 |
| 2023/0276220 A1* | 8/2023 | Wang | .................... | H04W 60/00 |
| | | | | 370/331 |
| 2024/0015630 A1* | 1/2024 | Talebi Fard | ............ | H04W 8/08 |
| 2024/0323914 A1* | 9/2024 | Wu | ..................... | H04W 68/005 |

OTHER PUBLICATIONS

S2-2107858, Qualcomm Incorporated et al, "Support of Paging Subgrouping", 3GPP draft, vol. SA WG2, No. e-Meeting, Oct. 22, 2021.

R1-2008021, CMCC: "Discussion on paging Enhancements", 3GPP draft, vol. RAN WG1, No. e-Meeting, Oct. 23, 2020.

China Intellectual Property Office Action 202211336023.0 Dated Aug. 13, 2025 (No English Translation Available).

3GPP TSG-SA2 Meeting #147e S2-2107857, Oct. 27, 2021, MediaTek Inc et.al,"Support for Paging Early Indication".

<3GPP TSG-CT WG1 Meeting #123-e C1-202465>, Apr. 9, 2020, Huawei et.al,"Correction on WUS assistance".

* cited by examiner

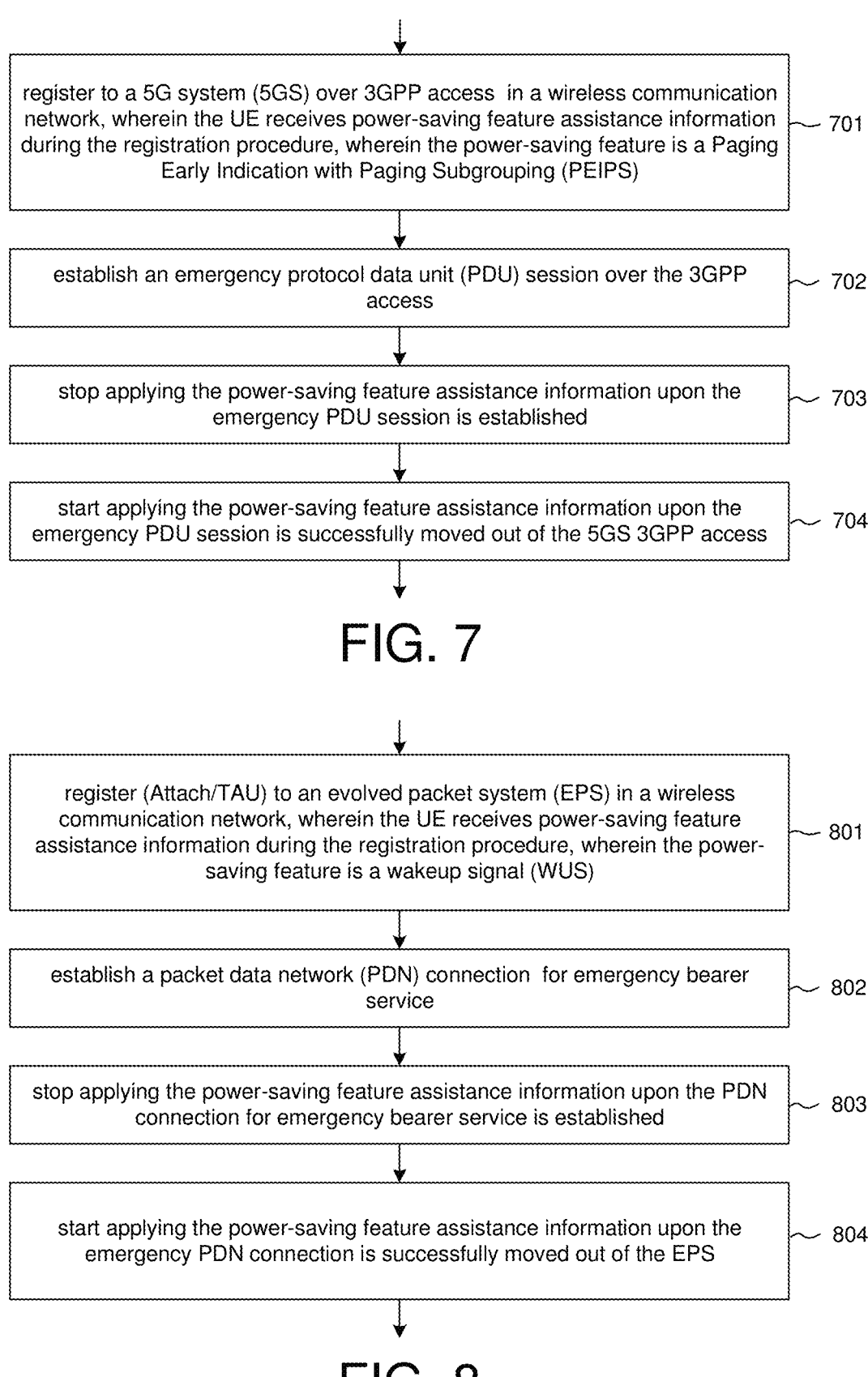

register to a 5G system (5GS) over 3GPP access  in a wireless communication network, wherein the UE receives power-saving feature assistance information during the registration procedure, wherein the power-saving feature is a Paging Early Indication with Paging Subgrouping (PEIPS) — 701 establish an emergency protocol data unit (PDU) session over the 3GPP access — 702 stop applying the power-saving feature assistance information upon the emergency PDU session is established — 703 start applying the power-saving feature assistance information upon the emergency PDU session is successfully moved out of the 5GS 3GPP access — 704

FIG. 7 register (Attach/TAU) to an evolved packet system (EPS) in a wireless communication network, wherein the UE receives power-saving feature assistance information during the registration procedure, wherein the power-saving feature is a wakeup signal (WUS) — 801 establish a packet data network (PDN) connection  for emergency bearer service — 802 stop applying the power-saving feature assistance information upon the PDN connection for emergency bearer service is established — 803 start applying the power-saving feature assistance information upon the emergency PDN connection is successfully moved out of the EPS — 804

FIG. 8

POWER SAVING FEATURE ASSISTANCE INFORMATION IN 5GS AND EPS

CROSS REFERENCE TO RELATED APPLICATION

This application claims priority under 35 U.S.C. § 119 from U.S. Provisional Application No. 63/274,575, entitled "PEIPS and non-3GPP access and EPS," filed on Nov. 2, 2021, the subject matter of which is incorporated herein by reference.

TECHNICAL FIELD

The disclosed embodiments relate generally to wireless communication systems, and, more particularly, to power efficient paging mechanism with paging early indication or wakeup signal with assistance information for emergency PDU session or PDN connection for emergency bearer service (emergency PDN connection).

BACKGROUND

Third generation partnership project (3GPP) and 5G New Radio (NR) mobile telecommunication systems provide high data rate, lower latency and improved system performances. In 3GPP NR, 5G terrestrial New Radio (NR) access network (includes a plurality of base stations, e.g., Next Generation Node-Bs (gNBs), communicating with a plurality of mobile stations referred as user equipment (UEs). Orthogonal Frequency Division Multiple Access (OFDMA) has been selected for NR downlink (DL) radio access scheme due to its robustness to multipath fading, higher spectral efficiency, and bandwidth scalability. Multiple access in the downlink is achieved by assigning different sub-bands (i.e., groups of subcarriers, denoted as resource blocks (RBs)) of the system bandwidth to individual users based on their existing channel condition. In LTE and NR networks, Physical Downlink Control Channel (PDCCH) is used for downlink scheduling. Physical Downlink Shared Channel (PDSCH) is used for downlink data. Similarly, Physical Uplink Control Channel (PUCCH) is used for carrying uplink control information. Physical Uplink Shared Channel (PUSCH) is used for uplink data. In addition, physical random-access channel (PRACH) is used for non-contention-based RACH.

One important use of broadcast information in any cellular systems is to set up channels for communication between the UE and the gNB. This is generally referred to as paging. Paging is a procedure the wireless network uses to find a UE, before the actual connection establishment. Paging is used to alert the UE of an incoming session (e.g., mobile terminated voice call, or downlink IP packets). In most cases, the paging process happens while UE is in radio resource control (RRC) idle mode or inactive mode. This means that UE has to monitor whether the networking is sending any paging message to it, and it has to spend some energy to run this "monitoring" process. During idle/inactive mode, a UE gets into and stays in sleeping mode defined in discontinuous reception (DRX) cycle. UE periodically wakes up and monitors PDCCH to check for the presence of a paging message. If the PDCCH indicates that a paging message is transmitted in a subframe, then the UE demodulates the paging channel to see if the paging message is directed to it.

In NR, paging reception consumes less than 2.5% of the total power. However, due to synchronization signal block (SSB) transmission scheme in NR, LOOP operations (including AGC, FTL, and TTL) and measurements (MEAS) can only be performed in certain occasions. As a result, the gap between the SSBs for LOOP/MEAS and paging occasion (PO) is longer, and UE may enter light sleep mode in the gap. If there is an indication before paging and UE monitors PO only if the indication exists, then UE can save power not only for paging reception, but also for the light sleep between the last SSB and PO gap.

In 5G system, paging early indication (PEI) notifies UEs of potentially relevant incoming paging such that these UEs are then able to skip POs in which the UEs are (definitely) not being paged, thus saving power (decoding POs being more power hungry than decoding PEI). To this effect, UE subgrouping is introduced that allows waking up subgroups of UEs for potentially relevant paging. The RAN and UE may use a Paging Early Indication with Paging Subgrouping (PEIPS) to reduce the UE's power consumption in RRC_IDLE and RRC_INACTIVE over NR. The Paging Subgrouping can be based on either the UE's temporary ID or a paging subgroup allocated by the AMF. Similar power saving features are also available in 4G EPS via the use of wakeup signals (WUS).

When UE has an active emergency PDU session or PDN connection (associated with 3GPP access) established, the UE behavior of applying PEIPS or WUS for power saving needs to be re-defined.

SUMMARY

A method of applying power-saving feature assistance information for emergency PDU session or PDN connection for emergency bearer service (emergency PDN connection) associated with 3GPP access is provided. In 5GS, when an emergency PDU session (associated with 3GPP access) is successfully established after the UE received the Negotiated PEIPS assistance information IE during the last registration procedure, the UE does not use the PEIPS assistance information until the successful completion of the handover of the emergency PDU session from 3GPP access to non-3GPP access and/or the successful completion of the transfer of the emergency PDU session from N1 mode to S1 mode (or 5GS to EPS/ePDG connected to EPC). In EPS, when an emergency PDN connection is successfully established after the UE received the Negotiated WUS assistance information IE during the last registration (Attach/TAU) procedure, the UE does not use the WUS assistance information until the successful completion of the handover of the emergency PDN connection from 3GPP access to non-3GPP access and/or the successful completion of the transfer of the emergency PDN connection from S1 mode to N1 mode (or EPC to 5GS).

In one embodiment, a UE registers to a 5G system (5GS) over 3GPP access in a wireless communication network, wherein the UE receives power-saving feature assistance information during the registration procedure, wherein the power-saving feature is a Paging Early Indication with Paging Subgrouping (PEIPS). The UE establishes an emergency protocol data unit (PDU) session over the 3GPP access. The UE stops applying the power-saving feature assistance information when the emergency PDU session is established successfully. The UE resumes applying the power-saving feature assistance information upon the emergency PDU session is successfully moved out of the 5GS 3GPP access.

In another embodiment, a UE registers to an evolved packet system (EPS) by a user equipment (UE) in a wireless communication network, wherein the UE receives power-saving feature assistance information during the registration (Attach/TAU) procedure, wherein the power-saving feature is a wakeup signal (WUS). The UE establishes an emergency packet data network (PDN) connection. The UE stops applying the power-saving feature assistance information when the emergency PDN connection is established successfully. The UE starts applying the power-saving feature assistance information upon the emergency PDN connection is successfully moved out of the EPS.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

FIG. 7 is a flow chart of a method of suspending and resuming PEIPS assistance information in a 5G/NR network in accordance with one novel aspect of the present invention.

FIG. 8 is a flow chart of a method of suspending and resuming WUS assistance information in a 4G EPS network in accordance with one novel aspect of the present invention.

DETAILED DESCRIPTION

Reference will now be made in detail to some embodiments of the invention, examples of which are illustrated in the accompanying drawings.

Figure 1:
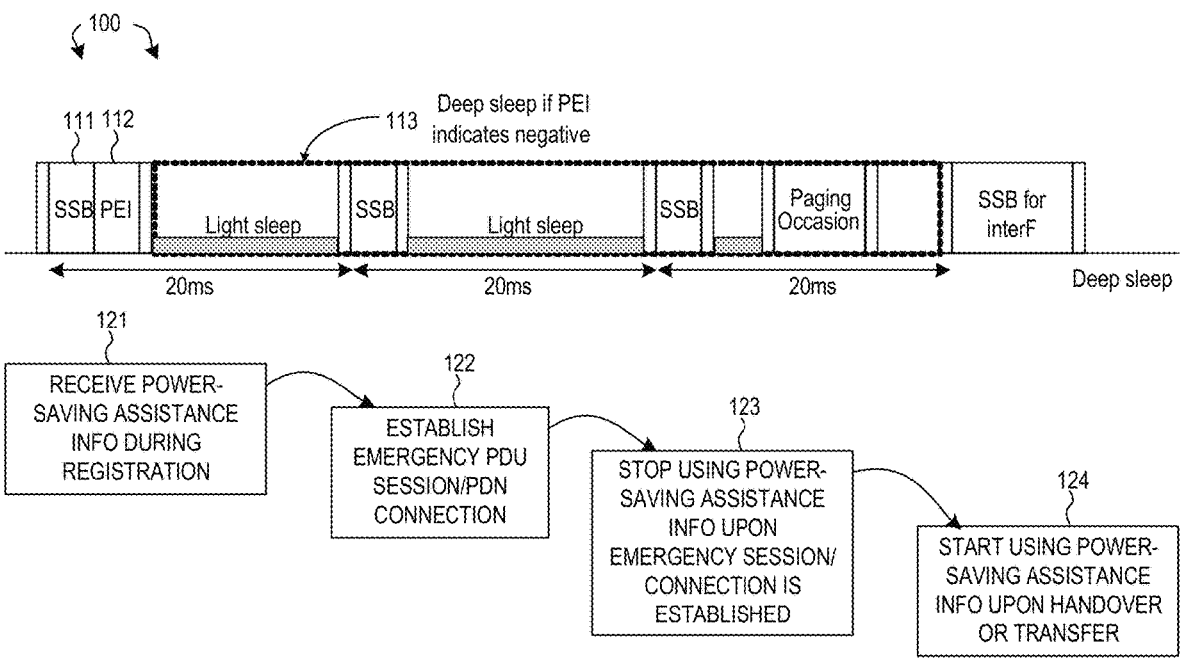
FIG. 1 illustrates the concept of paging reception with paging early indication (PEI) in a 5G New Radio (NR) network for power saving and the application of PEI with paging subgrouping (PEIPS) assistance information in accordance with one novel aspect.

FIG. 1 illustrates the concept of paging reception with paging early indication (PEI) in a 5G New Radio (NR) network 100 for power saving and the application of PEI with paging subgrouping (PEIPS) assistance information in accordance with one novel aspect. In 3GPP NR, 5G NR access network, a plurality of base stations, e.g., Next Generation Node-Bs (gNBs), communicating with a plurality of mobile stations referred as user equipment (UEs). Orthogonal Frequency Division Multiple Access (OFDMA) has been selected for NR downlink (DL) radio access scheme due to its robustness to multipath fading, higher spectral efficiency, and bandwidth scalability. In both LTE and NR networks, Physical Downlink Control Channel (PDCCH) is used for downlink scheduling. Physical Downlink Shared Channel (PDSCH) is used for downlink data.

Similarly, Physical Uplink Control Channel (PUCCH) is used for carrying uplink control information. Physical Uplink Shared Channel (PUSCH) is used for uplink data. In addition, physical random-access channel (PRACH) is used for non-contention-based RACH.

In 5G system, paging early indication (PEI) notifies UEs of potentially relevant incoming paging such that these UEs are then able to skip paging occasions (POs) in which they are (definitely) not being paged, thus saving power (decoding POs being more power hungry than decoding PEI). FIG. 1 depicts the synchronization signal block (SSB) transmission scheme in NR, where LOOP operations (including AGC, FTL, and TTL) and measurements (MEAS) can only be performed in certain occasions, e.g., during SSB bursts. UE wakes up for SSBs, e.g., every 20 ms (every 2 radio frames). UE may enter light sleep mode in the gap between the SSBs for LOOP/MEAS and PO. When PEI is introduced, UE can skip PO monitoring if PEI indicates negative, e.g., entering deep sleep in the gap between PEI and PO. PEIs are always transmitted and are located near SSB bursts, thus aiming at power saving not only PO monitoring but also light sleep and state transitions when no UE is paged. UE may or may not need extra time for PEI monitoring in addition to SSB.

In FIG. 1, PEI 112 is located next to the SSB burst 111. If the PEI indicates that no UEs in the UE group is paged (PEI is negative), then UE enters deep sleep in 113, e.g., entering deep sleep in the gap between PEI and PO. Further, UE paging subgrouping is introduced that allows waking up subgroups of UEs for potentially relevant paging. The RAN and UE may use a Paging Early Indication with Paging Subgrouping (PEIPS) to reduce the UE's power consumption in RRC_IDLE and RRC_INACTIVE over NR. The Paging Subgrouping can be based on either the UE's temporary ID or a paging subgroup allocated by the network. Similar power saving features are also available in 4G EPS via the use of wakeup signals (WUS).

In accordance with one novel aspect, a method of applying power-saving feature assistance information is provided. In step 121, a UE registers to 5GS/EPS and receives power-saving assistance information. In step 122, the UE establishes an emergency PDU session in 5GS or PDN connection in EPS, over 3GPP access. In step 123, the UE stops (suspend) using the power-saving assistance information. In step 124, the UE starts (resume) to use the power-saving assistance information. In 5GS, when an emergency PDU session (associated with 3GPP access) is successfully established after the UE received the Negotiated PEIPS assistance information IE during the last registration procedure, the UE does not use the PEIPS assistance information until the successful completion of the handover of the emergency PDU session from 3GPP access to non-3GPP access and/or the successful completion of the transfer of the emergency PDU session from N1 mode to S1 mode (or 5GS to EPC). In EPS, when an emergency PDN connection (associated with 3GPP access) is successfully established after the UE received the Negotiated WUS assistance information IE during the last registration (Attach/TAU) procedure, the UE does not use the WUS assistance information until the successful completion of the handover of the emergency PDN connection to non-3GPP access and/or the successful completion of the transfer of the emergency PDN connection from S1 mode to N1 mode (or EPC to 5GS). When UE has emergency session ongoing, the power saving is not important anymore, thus the UE stops using power saving features.

Figure 2:
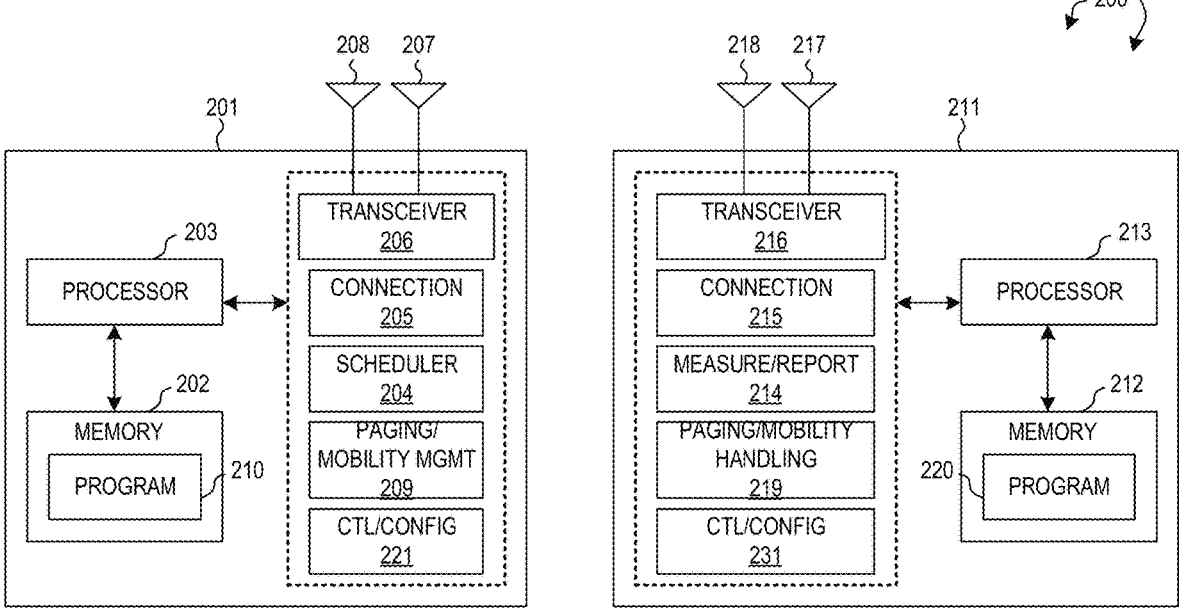
FIG. 2 is a simplified block diagram of a UE and a base station in accordance with various embodiments of the present invention.

FIG. 2 is a simplified block diagram of wireless devices 201 and 211 in accordance with embodiments of the present invention. For wireless device 201 (e.g., a base station), antennae 207 and 208 transmit and receive radio signal. RF transceiver module 206, coupled with the antennae, receives RF signals from the antennae, converts them to baseband signals and sends them to processor 203. RF transceiver 206 also converts received baseband signals from the processor, converts them to RF signals, and sends out to antennae 207 and 208. Processor 203 processes the received baseband signals and invokes different functional modules and circuits to perform features in wireless device 201. Memory 202 stores program instructions and data 210 to control the operations of device 201.

Similarly, for wireless device 211 (e.g., a user equipment), antennae 217 and 218 transmit and receive RF signals. RF transceiver module 216, coupled with the antennae, receives RF signals from the antennae, converts them to baseband signals and sends them to processor 213. The RF transceiver 216 also converts received baseband signals from the processor, converts them to RF signals, and sends out to antennae 217 and 218. Processor 213 processes the received baseband signals and invokes different functional modules and circuits to perform features in wireless device 211. Memory 212 stores program instructions and data 220 to control the operations of the wireless device 211.

The wireless devices 201 and 211 also include several functional modules and circuits that can be implemented and configured to perform embodiments of the present invention. In the example of FIG. 2, wireless device 201 is a base station that includes an RRC connection handling module 205, a scheduler 204, a paging and mobility management module 209, and a control and configuration circuit 221. Wireless device 211 is a UE that includes a connection handling module 215, a measurement and reporting module 214, a paging and mobility handling module 219, and a control and configuration circuit 231. Note that a wireless device may be both a transmitting device and a receiving device. The different functional modules and circuits can be implemented and configured by software, firmware, hardware, and any combination thereof. The function modules and circuits, when executed by the processors 203 and 213 (e.g., via executing program codes 210 and 220), allow base station 201 and user equipment 211 to perform embodiments of the present invention.

In one example, the base station 201 establishes connection for UE 211 via connection handling circuit 205, schedules downlink and uplink transmission for UEs via scheduler 204, performs paging, mobility, and handover management via mobility management module 209, and provides paging, measurement, and measurement reporting configuration information to UEs via configuration circuit 221. The UE 211 handles connection via connection handling circuit 215, performs measurements and reports measurement results via measurement and reporting module 214, performs paging monitoring and mobility via paging and mobility handling module 219, and obtains configuration information via control and configuration circuit 231. In one novel aspect, UE 211 receives power-saving assistance information and monitors PO accordingly. UE 211 stops using the assistance information for emergency connection over 3GPP access, and starts to use the assistance information upon the emergency connection is moved out of 5GS 3GPP access or EPS 3GPP access.

Figure 3:
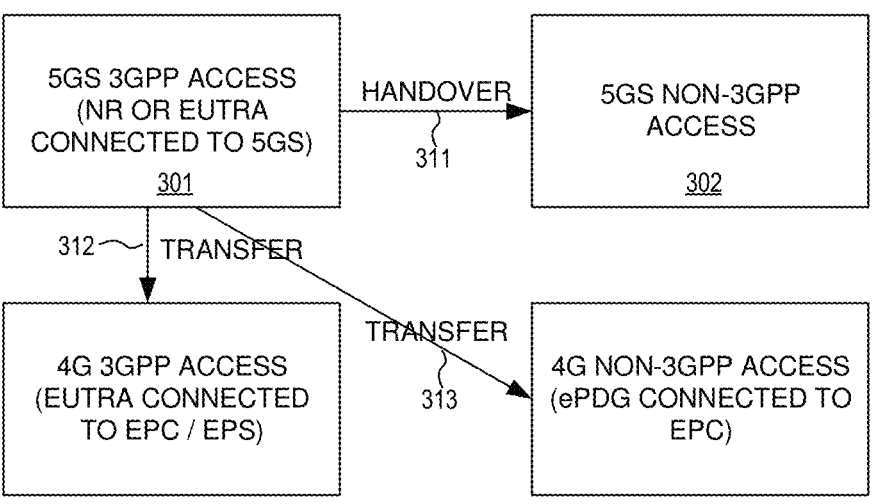
FIG. 3 illustrates handover and transfer for a PDU session between 5GS 3GPP/non-3GPP access and EPC 3GPP/non-3GPP access.

FIG. 3 illustrates handover and transfer for a PDU session between 5GS 3GPP/non-3GPP access and EPC 3GPP/non-3GPP access. In 5GS, a PDU session can be associated with 3GPP access (301) or associated with non-3GPP access (302). The PDU session is considered to be associated with 3GPP access when it is established over 3GPP access in NR, or in EUTRA connected to 5GS. Depending on different scenarios, the PDU session can be handover or transferred. In 311, the PDU session is handover to 5GS non-3GPP access (which has no paging procedure). In 312, the PDU session is transferred to 4G EPS (which implies 3GPP access), e.g., to EUTRA that is connected to EPC (which includes both 3GPP and non-3GPP access). In 313, the PDU session is transferred to 4G non-3GPP access, e.g., to ePDG that is connected to EPC. The PDU session can be a regular PDU session or an emergency PDU session.

Figure 4:
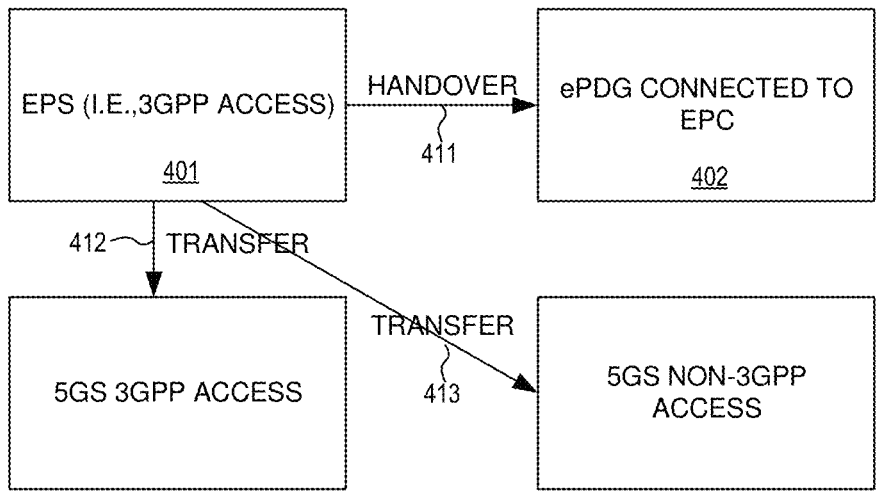
FIG. 4 illustrates handover and transfer for a PDN connection between EPC 3GPP/non-3GPP access and 5GS 3GPP/non-3GPP access.

FIG. 4 illustrates handover and transfer for a PDN connection between EPC 3GPP/non-3GPP access and 5GS 3GPP/non-3GPP access. In EPC, a PDN connection can be associated with 3GPP access (401) or associated with non-3GPP access (402). The PDN connection is considered to be associated with 3GPP access when it is established over 3GPP access in EPS (EUTRA connected to EPC). Depending on different scenarios, the PDN connection can be handover or transferred. In 411, the PDN connection is handover to EPS non-3GPP access (ePDG connected to EPC). In 412, the PDN connection is transferred to 5GS 3GPP access. In 413, the PDN connection is transferred to 5GS non-3GPP access. The PDN connection can be a regular PDN connection or an emergency PDN connection.

Figure 5:
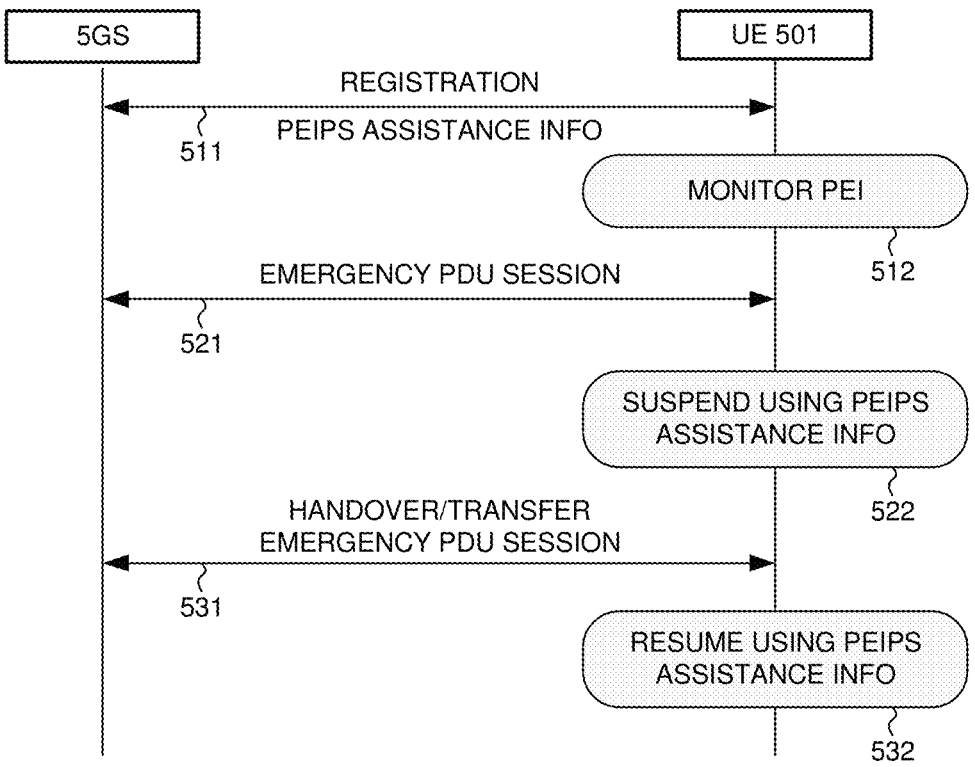
FIG. 5 illustrates a sequence flow between a UE and 5GS network the reception, suspend, and resume of PEIPS assistance information in one novel aspect.

FIG. 5 illustrates a sequence flow between a UE and 5GS network the reception, suspend, and resume of PEIPS assistance information in one novel aspect. In step 511, UE 501 registers to the 5GS network over 3GPP access. During the last registration procedure, UE 501 obtains the power-saving feature assistance information IE. In 5GS, the power saving feature can be PEIPS (NR), and the power saving feature assistance information can be PEIPS (NR) assistance information, which comprises paging early indicators for monitoring paging occasions with power-saving. In step 512, UE 501 monitors paging according to the PEIPS assistance information to save power consumption. In step 521, an emergency PDU session is established successfully over 3GPP access, and both the UE and the network (AMF) should not use the PEIPS assistance information until a later event. In step 522, UE 501 stops (suspends) using the PEIPS assistance information.

Later on, UE 501 detects an event occurred to the emergency PDU session. The event may include 1) the successful complete of the PDU session release procedure of the emergency PDU session; 2) the UE receives PEIPS assistance information during the registration procedure with PDU session status IE or upon successful completion of a service request procedure, if the UE or the network locally releases the emergency PDU session; 3) the successful completion of handover of the emergency PDU session from 3GPP to non-3GPP access; or 4) the successful transfer of the emergency PDU session in 5GS to EPS (EUTRAN) or ePDG connected to EPC (EPC+ePDG) (since PEIPS is only applicable in NR). For example, in step 531, UE 501 determines that the emergency PDU session is handover (to non-3GPP) or transferred (to EPC). Accordingly, in step 532, UE 501 starts (resumes) to use the PEIPS assistance information.

Figure 6:
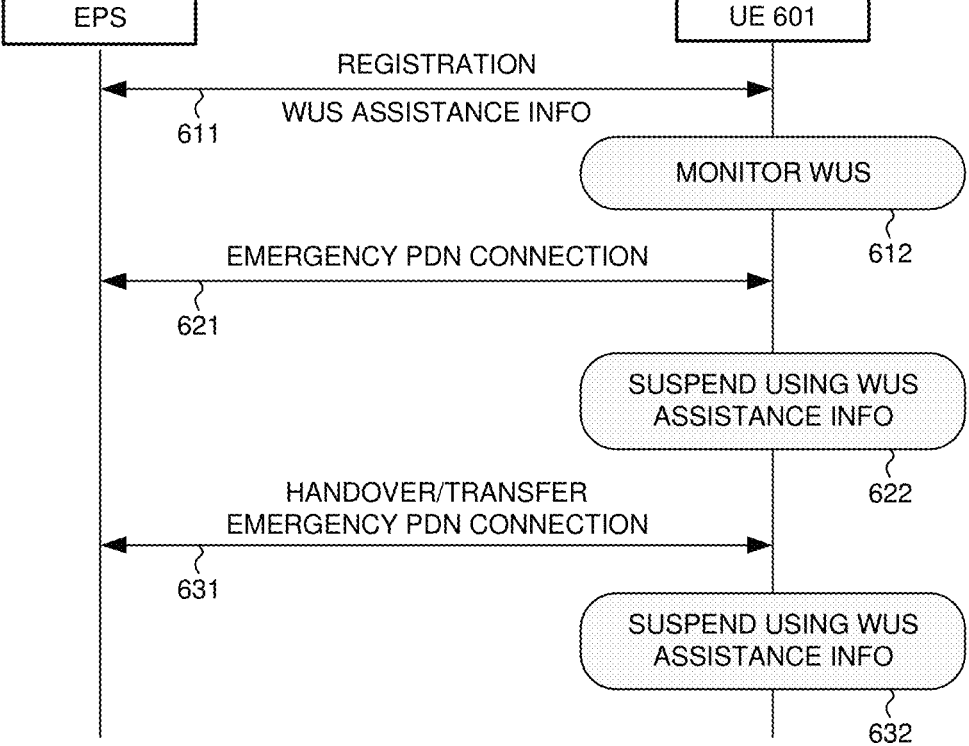
FIG. 6 illustrates a sequence flow between a UE and EPS network the reception, suspend, and resume of WUS assistance information in one novel aspect.

FIG. 6 illustrates a sequence flow between a UE and EPS network the reception, suspend, and resume of WUS assistance information in one novel aspect. In step 611, UE 601 registers to the EPS network over 3GPP access. During the last registration(Attach/TAU) procedure, UE 601 obtains the power-saving feature assistance information IE. In EPS, the power saving feature can be wakeup signal (WUS), and the power saving feature assistance information can be WUS assistance information, which comprises signals for monitoring paging occasions with power-saving. In step 612, UE 601 monitors paging according to the WUS assistance information to save power consumption. In step 621, an emergency PDN connection is established successfully over 3GPP access, and both the UE and the network (MME) should not use the WUS assistance information until a later event. Accordingly, in step 622, UE 601 stops (suspends) using the WUS assistance information.

Later on, UE 601 detects an event occurred to the emergency PDN connection. The event may include 1) the successful complete of the PDP connectivity release procedure of the emergency PDN connection; 2) the UE receives WUS assistance information during the registration procedure with PDP connectivity status IE or upon successful completion of a service request procedure, if the UE or the network locally releases the emergency PDN connection; 3) the successful completion of handover of the emergency PDN connection from 3GPP to non-3GPP access; or 4) the successful transfer of the emergency PDN connection in EPS to 5GS 3GPP or to 5GS non-3GPP. For example, in step 631, UE 601 determines that the emergency PDN connection is handover (to EPC non-3GPP) or transferred (to 5GS). Accordingly, in step 632, UE 601 starts (resumes) to use the WUS assistance information.

FIG. 7 is a flow chart of a method of suspending and resuming PEIPS assistance information in a 5G/NR network in accordance with one novel aspect of the present invention. In step 701, a UE registers to a 5G system (5GS) over 3GPP access in a wireless communication network, wherein the UE receives power-saving feature assistance information during the registration procedure, wherein the power-saving feature is a Paging Early Indication with Paging Subgrouping (PEIPS). In step 702, the UE establishes an emergency protocol data unit (PDU) session over the 3GPP access. In step 703, the UE stops applying the power-saving feature assistance information upon the emergency PDU session is established. In step 704, the UE resumes applying the power-saving feature assistance information upon the emergency PDU session is successfully moved out of the 5GS 3GPP access.

FIG. 8 is a flow chart of a method of suspending and resuming WUS assistance information in a 4G EPS network in accordance with one novel aspect of the present invention. In step 801, a UE registers to an evolved packet system (EPS) over 3GPP access by a user equipment (UE) in a wireless communication network, wherein the UE receives power-saving feature assistance information during the registration procedure, wherein the power-saving feature is a wakeup signal (WUS). In step 802, the UE establishes a packet data network (PDN) connection for emergency bearer service. In step 803, the UE stops applying the power-saving feature assistance information upon the PDN connection for emergency bearer service is established. In step 804, the UE starts applying the power-saving feature assistance information upon the PDN connection for emergency bearer service is successfully moved out of EPS (the EPC 3GPP access).

Although the present invention is described above in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method, comprising:
    registering to a 5G system (5GS) over 3GPP access by a user equipment (UE) in a wireless communication network, wherein the UE receives power-saving feature assistance information during the registration procedure, wherein the power-saving feature is a Paging Early Indication with Paging Subgrouping (PEIPS);
    establishing an emergency protocol data unit (PDU) session over the 3GPP access;
    suspending application of the power-saving feature assistance information upon an establishment of the emergency PDU session; and
    resuming application of the power-saving feature assistance information upon the emergency PDU session being successfully moved out of the 5GS 3GPP access.

2. The method of claim 1, wherein the power-saving feature assistance information is PEIPS assistance information indicating the UE to listen to a paging early indication.

3. The method of claim 2, wherein the PEIPS assistance information comprises a paging subgroup ID.

4. The method of claim 3, wherein the paging subgroup ID is allocated by the 5GS network.

5. The method of claim 1, wherein the emergency PDU session in 5GS is handed over from 3GPP access to non-3GPP access.

6. The method of claim 1, wherein the emergency PDU session in 5GS is transferred to EPS.

7. The method of claim 1, wherein the emergency PDU session in 5GS is transferred to an evolved packet gateway (ePDG) connected to an evolved packet core (EPC).

8. A method, comprising:
    registering to an evolved packet system (EPS) by a user equipment (UE) in a wireless communication network, wherein the UE receives power-saving feature assistance information during the registration procedure, wherein the power-saving feature is a wakeup signal (WUS);
    establishing a packet data network (PDN) connection for emergency bearer service;
    suspending application of the power-saving feature assistance information upon an establishment of the PDN connection for emergency bearer service; and
    resuming application of the power-saving feature assistance information upon the PDN connection for emergency bearer service being successfully moved out of the EPS.

9. The method of claim 8, wherein the registration procedure comprises ATTACH procedure or Tracking Area Updating (TAU) procedure.

10. The method of claim 8, wherein the PDN connection for emergency bearer service in EPS handed over from 3GPP access to non-3GPP access.

11. The method of claim 8, wherein the PDN connection for emergency bearer service in EPS is transferred to 5GS 3GPP access.

12. The method of claim 8, wherein the PDN connection for emergency bearer service in EPS is transferred to 5GS non-3GPP access.

13. A User Equipment (UE), comprising:
    a registration handling circuit that performs registration to a 5G system (5GS) or an evolved packet system (EPS) over 3GPP access by a user equipment (UE) in a wireless communication network, wherein the UE receives power-saving feature assistance information during the registration;

a connection handling circuit that establishes an emergency PDU session in 5GS or a PDN connection for emergency bearer service in EPS over the 3GPP access;

suspending application of the power-saving feature assistance information upon an establishment of the emergency PDU session or the PDN connection for emergency bearer service; and resuming application of the power-saving feature assistance information upon the emergency PDU session is successfully moved out of the 5GS 3GPP access, or upon the PDN connection for emergency bearer service being successfully moved out of the EPS.

14. The UE of claim 13, wherein the power-saving feature is a Paging Early Indication with Paging Subgrouping (PEIPS) in 5GS, and the power-saving feature assistance information is PEIPS assistance information.

15. The UE of claim 14, wherein the emergency PDU session in 5GS is handover from 3GPP access to non-3GPP access.

16. The UE of claim 14, wherein the emergency PDU session in 5GS is transferred to EPS or transferred to ePDG connected to EPC.

17. The UE of claim 13, wherein power-saving feature is a wakeup signal (WUS) in EPS, and the power-saving feature assistance information is WUS assistance information.

18. The UE of claim 17, wherein the PDN connection for emergency bearer service in EPS is handover to non-3GPP access.

19. The UE of claim 17, wherein the PDN connection for emergency bearer service in EPS is transferred to 5GS.

* * * * *